June 27, 1944.  J. W. ROSS  2,352,288
GLASS FEEDER
Filed Nov. 27, 1941  2 Sheets-Sheet 1

Inventor
James W. Ross
By
Eulester+Eulester
Attorneys

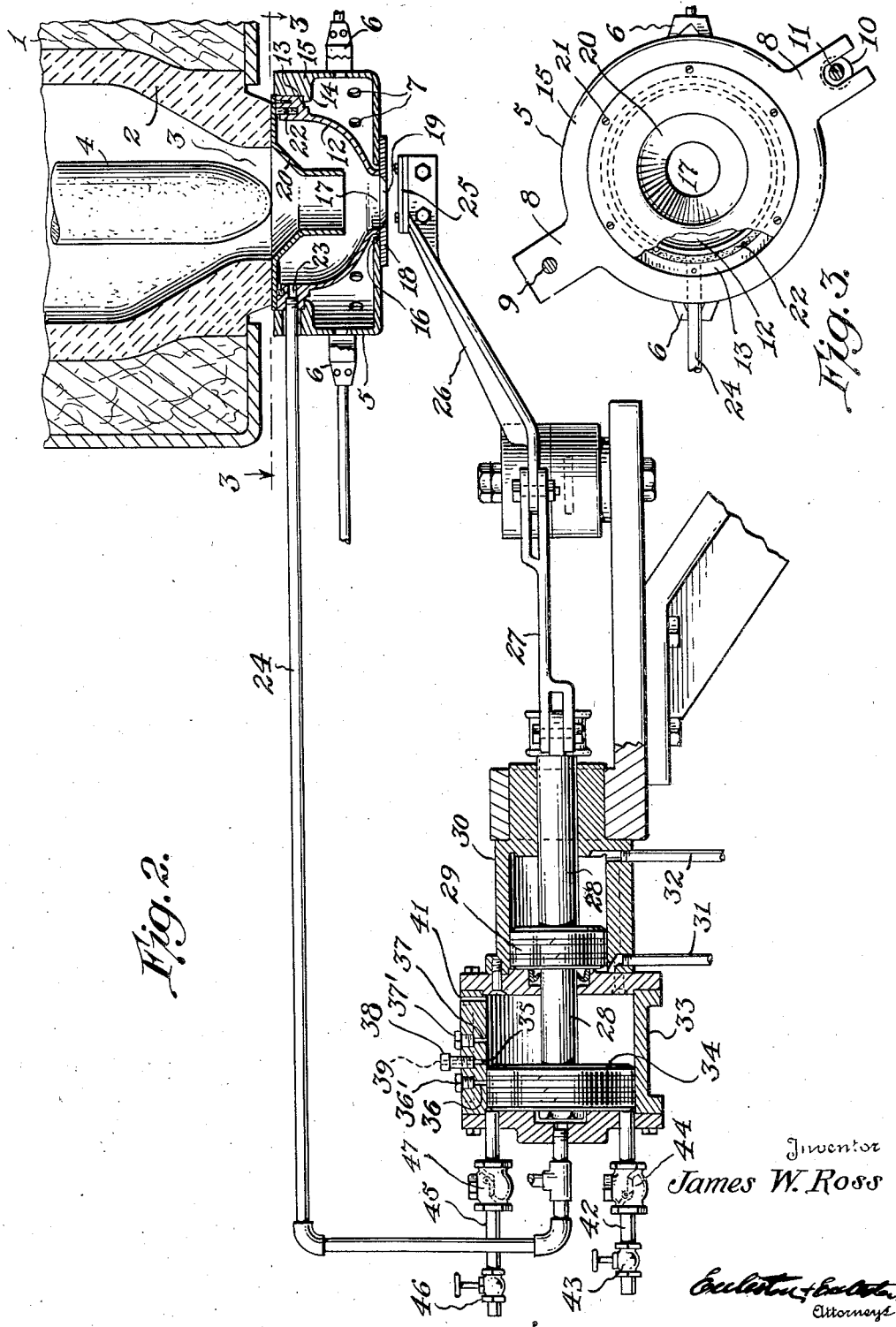

Patented June 27, 1944

2,352,288

UNITED STATES PATENT OFFICE 2,352,288

GLASS FEEDER

James W. Ross, Washington, Pa., assignor to Hazel-Atlas Glass Company, Wheeling, W. Va., a corporation of West Virginia Application November 27, 1941, Serial No. 420,723

8 Claims. (Cl. 49—55)

The invention relates to means for periodically delivering glass charges to forming machines, and one of the objects of the invention is to provide a simple and inexpensive feeder which is arranged beneath the flow orifice of the flow spout.

Another object of the invention is to provide a feeder which is controlled by the operation of the shears which sever the glass charges, so that the timing between the operation of the shears and the operation of the means controlling the glass charges, will always be correct.

Various other objects and advantages of the invention will be apparent to those skilled in the art, from the following detailed description when taken in connection with the accompanying drawings, in which, Figure 1 is a perspective view of the feeder.

Figure 2 is a vertical sectional view thereof; and

Figure 3 is a horizontal sectional view taken on line 3—3 of Fig. 2, with parts broken away.

Figure 1:
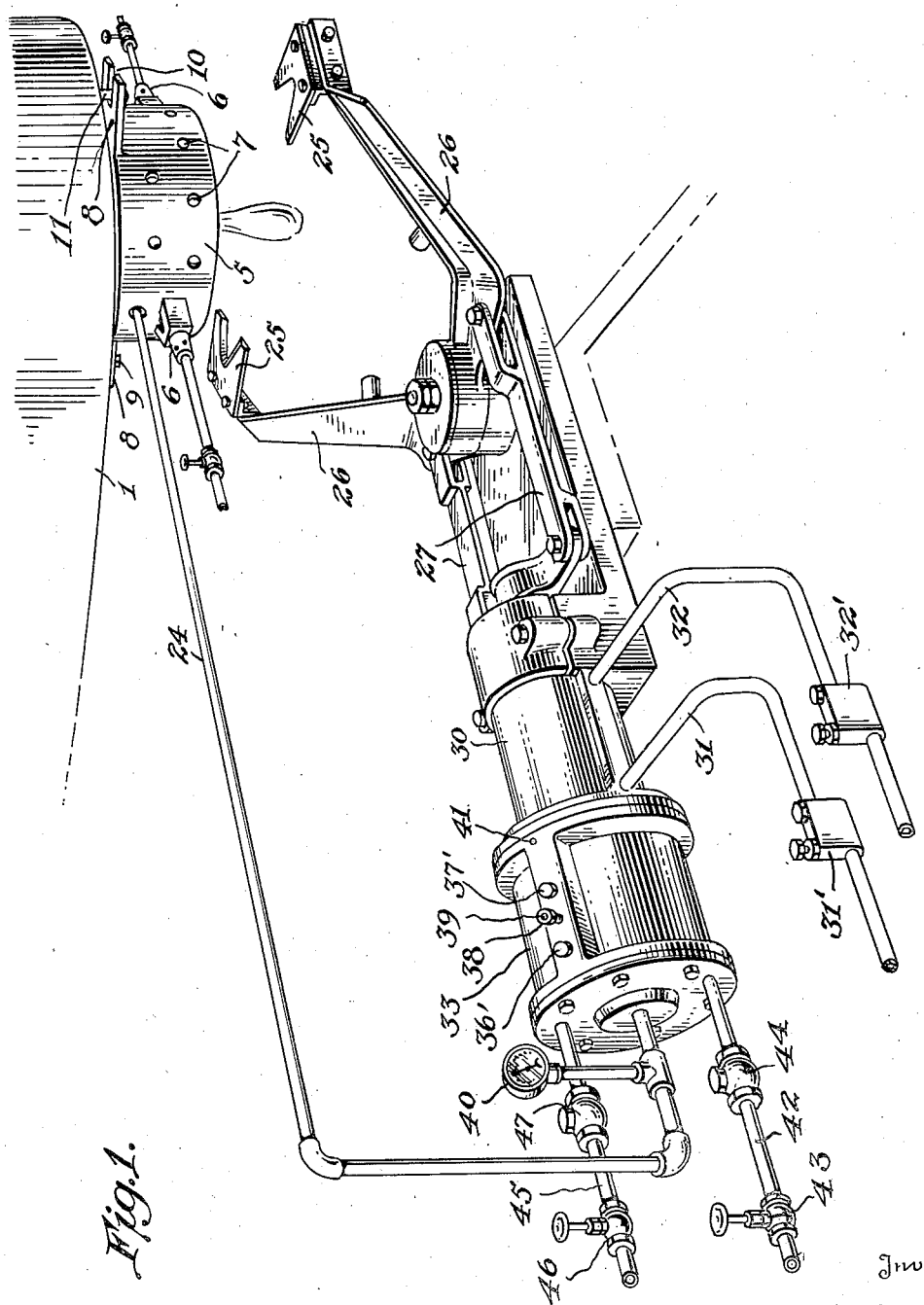

Referring to the drawings in more detail, numeral 1 indicates the flow spout which communicates with a continuous melting tank (not shown). In the outer end of the flow spout is the usual nose block 2 having a flow orifice 3. Numeral 4 indicates a plug which has its lower end in or over the flow orifice. This plug is stationary and controls the volume flow of glass through the orifice 3. The plug is vertically and laterally adjustable by any desired means. Such adjusting means are well known in the art, and illustration thereof is not necessary.

Numeral 5 refers to a heating chamber which is attached to the flow spout beneath the flow orifice. Numeral 6 indicates burners for heating the chamber, and numeral 7 indicates apertures in the chamber wall for the admission of air for combustion purposes. The upper end of the heating chamber is provided with two outwardly extending flanges 8. One of these flanges is provided with an aperture to receive a bolt 9 extending downwardly from the flow spout, and the other flange is provided with a slot 10 to receive a bolt 11 also extending downwardly from the flow spout. Of course any attaching means may be employed, but the means illustrated allows the heating chamber and associated parts to be quickly swung clear of the flow orifice, to permit access thereto, and also to permit quick removal and replacement of the heating chamber and associated parts.

Numeral 12 indicates a bowl formed of metal or refractory material, which is mounted in the heating chamber, by any desired means. In the specific embodiment illustrated the bowl has at its upper end an annular shoulder 13 which rests upon an annular flange 14 extending inwardly from the thickened upper portion 15 of the chamber wall. Thus the bowl and chamber nest together when in use, but are readily separated for purposes of inspection, repair, etc.

The bottom of the heating chamber is provided with an opening 16 into which extends the lower end of the bowl, and the lower end of the bowl is provided with an orifice 17 through which the glass flows. An orifice ring 18, of metal or refractory material, is removably attached to the bottom of the heating chamber. The opening 19 in the orifice ring may be of any desired size.

Numeral 20 refers to a funnel-like member which is attached to the top of the bowl, as by screws 21, in the embodiment illustrated. This member, which may be of metal or refractory material, has an air tight connection with the bowl, by reason of packing 22. The bowl and funnel member form a unit which is air tight when the orifice in the bottom of the bowl is filled with glass in the normal operation of the feeder. The unit is simply nested in the heating chamber, and therefore is readily removable, and of course the unit consisting of the bowl and funnel may be integrally formed, if preferred.

The flow of glass through the orifice may be controlled and regulated by the pressure, positive or negative, on the surface of the glass in the bowl. For the purpose of admitting and withdrawing air, the bowl is provided with an opening 23, to which is fitted a pipe or hose 24.

Numeral 25 refers to the blades of ordinary shears which sever the glass charges; the charges then dropping into molds (not shown) to be fabricated into glass articles. The blades are carried by pivotally mounted arms 26, which are connected by links 27 with a piston rod 28 and piston 29 of a cylinder 30.

The piston rod is periodically reciprocated, to close and open the shears, by air pressure alternately admitted to opposite ends of the cylinder, through the pipes 31 and 32. Any ordinary timer may be employed to control the admission of air pressure to the shear cylinder, to time the operation of the shears with the associated forming machine, and if desired by-pass valves 31' and 32' may be provided in the air lines 31 and 32. By the use of these valves the rate of exhaust from either end of the cylinder can be independently regulated, and without affecting the admission of pressure to either end of the cylinder, so that the speed at which the piston travels in either direction can be independently regulated.

Numeral 33 refers to a second cylinder which may be termed the feeder cylinder, and which is attached to the rear end of the shear cylinder 30. The piston rod 28 of the shear cylinder extends into the feeder cylinder and carries a piston 34. Thus the pistons of the shear cylinder and feeder cylinder always operate together.

The previously mentioned pipe or hose 24, which has one end connected with the feeder bowl 12, has its opposite end connected with the rear end of the feeder cylinder 33. Hence when the shear piston 29 moves to the right (Fig. 2) to close the shears and sever a gob of glass, the feeder piston 34 will similarly move to the right and thereby withdraw air from the feeder bowl, through line 24, to create a partial vacuum in the bowl. And when the shear piston and feeder piston move to the left, air will be delivered to the feeder bowl through the line 24.

After a partial vacuum has been created in the feeder bowl, above the glass therein, by the forward movement of the piston 34, it is necessary to break the vacuum. To accomplish this it is only necessary to provide a passage 35 extending through the cylinder wall, so that when the piston 34, in its forward movement, has passed the passage, the rear end of the cylinder will be opened to communication with the atmosphere, thus breaking the vacuum above the glass in the bowl 12. In the specific embodiment illustrated provision is made for varying the point at which the vacuum is broken. For this purpose, the cylinder wall is provided with two additional passages 36 and 37 which are shown as closed by removable plugs 36' and 37', and a plug 38 having a passage 39 is removably mounted in the passage 35. By the interchange of the plugs the vacuum can be broken when the piston 34 has passed any one of the passages 35, 36 or 37. It will be understood, of course, that when the piston 34 moves rearward it will close the open passage, and its continued rearward movement will force air through line 24 into the bowl 12 above the glass therein. A vacuum and pressure gage 40 may be provided in the line 24, if desired.

The forward end of the feeder cylinder 33 is provided with a passage 41, extending through the cylinder wall, so that the forward end of the cylinder is always in communication with the atmosphere, thus preventing the creation of pressure or vacuum in that end of the cylinder.

For the purpose of regulating the degree of vacuum created in the rear end of the feeder cylinder and in the feeder bowl, by the forward movement of the piston 34, a short pipe section 42 leads from the rear end of the cylinder and communicates with the atmosphere. Adjacent the free end of this pipe section an ordinary regulating valve 43 is provided, and between this valve and the cylinder is a check valve 44, which permits the passage of air to the rear end of the cylinder 33, but prevents the exit of air therefrom. Thus the volume of air admitted from the atmosphere to the rear end of cylinder 33, during the forward movement of the piston 34, is regulated by the mere adjustment of the hand valve 43, to thereby regulate the degree of vacuum created in the feeder bowl.

For the purpose of regulating the positive pressure created in the rear end of the feeder cylinder and in the feeder bowl, by the rearward movement of the piston 34, a second short pipe section 45 also leads from the rear end of the cylinder and communicates with the atmosphere. This pipe section is also provided with an ordinary regulating valve 46 and check valve 47, but in this instance the check valve permits the exit of air from the rear end of the cylinder, while preventing the entrance of air thereto. Thus the volume of air passing from the rear end of the cylinder to the atmosphere, during the rearward movement of the piston 34, is regulated by the adjustment of the hand valve 46, to control the pressure developed in the feeder bowl.

In the operation, the shear cylinder 30 is periodically operated to sever the glass charges, in timed relation with a forming machine, by any desired type of timer. The forward movement of the shear cylinder piston rod 28 closes the shears to sever a glass charge, which drops into a mold of a glass forming machine, and the shears are immediately opened. When the glass is cut it is desirable to lift the remaining stub off the shears. This is accomplished by creating a partial vacuum in the feeder bowl 12 above the glass therein. As previously described, the piston rod of the shear cylinder extends into the feeder cylinder 33 and carries the feeder cylinder piston 34, so that the shear cylinder piston and the feeder cylinder piston always move together. Thus when the shear cylinder piston moves forward to cause the severance of a glass charge, the feeder cylinder piston likewise moves forward and thereby withdraws air from the feeder bowl 12, through line 24, to create a partial vacuum in the bowl, whereby the remaining stub of glass is lifted from the shears when the charge is severed. The degree of vacuum created is regulated by the hand valve 43, as previously described.

The forward movement of the piston 34 also breaks the vacuum, when the piston passes the port 35, or other appropriately located port, thereby permitting the flow of glass through the orifice 19 to be resumed.

The movement of the piston 34 in the rearward direction, as the shears are opened, creates a positive pressure in the rear end of the cylinder 33 and in the feeder bowl 12, thereby forcing glass from the bowl and forming another gob of glass to be severed by the next operation of the shears.

The degree of pressure is regulated by the hand valve 46; and by the manipulation of the hand valves 43 and 46 the positive and negative pressures can be accurately balanced, so that the glass will remain at the desired level in the feeder bowl.

By the manipulation of the by-pass valves 31' and 32' the speed at which the piston rod 28 travels forward may be adjusted without changing the speed at which it travels rearward, and vice versa. And by the adjustment of the stationary plug 4 the volume flow of glass to the feeder bowl can be regulated.

The herein described feeder is extremely simple in construction and operation, and as the glass feeding is controlled by the operation of the shears, it follows that the timing between the feeding and the severing will always be correct.

It will also be noted that the feeder mechanism is arranged below the flow spout where it is easily accessible at all times, and can be readily removed and replaced.

Having fully described the invention, what I claim is:

1. A glass feeder including a flow spout, a receptacle arranged beneath the flow spout and receiving glass therefrom, said receptacle having an orifice in its bottom through which the glass flows, shears arranged beneath said orifice for severing the glass charges, means for periodically operating the shears, means for periodically increasing and decreasing the pressure on the glass in said receptacle, and means causing said shear operating means to operate said means for increasing and decreasing the pressure on the glass.

2. A glass feeder including a receptacle having an orifice through which glass is adapted to flow, means for periodically forming glass charges beneath said orifice, means for periodically severing the glass charges, and means causing said glass severing means to operate said glass forming means.

3. A glass feeder including a receptacle having an orifice through which glass is adapted to flow, means for periodically forming glass charges beneath said orifice, shears for severing the glass charges, a fluid motor for periodically operating said shears, and means causing said motor to control the operation of said charge forming means.

4. A glass feeder including a receptacle having an orifice through which glass is adapted to flow, means for periodically increasing and decreasing the pressure on the glass in the receptacle to form glass charges beneath the orifice, shears for severing the glass charges, a fluid motor for periodically operating the shears, and means causing said motor to control the operation of said means for increasing and decreasing the pressure on the glass in the receptacle.

5. A glass feeder including a receptacle having an orifice through which glass is adapted to flow, said receptacle having an air space, shears arranged beneath said orifice, a cylinder and piston for operating said shears, a second cylinder and piston, means causing the second piston to be operated by the first piston, and a pipe communicating with the air space of the receptacle and with the second mentioned cylinder.

6. A glass feeder including a receptacle having an orifice through which glass is adapted to flow, said receptacle having an air space, shears arranged beneath said orifice, a cylinder for operating the shears, a second cylinder and piston, the second cylinder communicating with said air space for periodically increasing and decreasing the air pressure therein, and means operatively connecting the pistons of the two cylinders.

7. A glass feeder including a receptacle having an orifice through which glass is adapted to flow, said receptacle having an air space, shears arranged beneath said orifice, a cylinder and piston for operating said shears, a second cylinder and piston, means causing the second piston to be operated by the first piston, a pipe communicating with the air space of the receptacle and with the second mentioned cylinder, whereby plus and minus pressures are alternately produced in the air space, and means for regulating the degree of plus pressure produced.

8. A glass feeder including a receptacle having an orifice through which glass is adapted to flow, said receptacle having an air space, shears arranged beneath said orifice, a cylinder and piston for operating said shears, a second cylinder and piston, means causing the second piston to be operated by the first piston, a pipe communicating with the air space of the receptacle and with the second mentioned cylinder, whereby plus and minus pressures are alternately produced in the air space, and means for regulating the degree of minus pressure produced.

JAMES W. ROSS.